US006960618B2

United States Patent
Ohnuma et al.

(10) Patent No.: US 6,960,618 B2
(45) Date of Patent: Nov. 1, 2005

(54) PREPARATION METHOD FOR RIGID POLYURETHANE FOAM

(75) Inventors: Yoshiyuki Ohnuma, Ashikaga (JP); Junichiro Mori, Ashikaga (JP); Hideki Tosaki, Sano (JP)

(73) Assignee: Achilles Corporation, Tokyo (JP)

(*) Notice: Subject to any disclaimer, the term of this patent is extended or adjusted under 35 U.S.C. 154(b) by 0 days.

(21) Appl. No.: 10/646,829

(22) Filed: Aug. 25, 2003

(65) Prior Publication Data

US 2004/0054022 A1 Mar. 18, 2004

(30) Foreign Application Priority Data

Sep. 13, 2002 (JP) ........................................ 2002-268135

(51) Int. Cl.[7] .................................................. C08J 9/04
(52) U.S. Cl. ....................... 521/130; 521/170; 521/172; 521/173; 521/174
(58) Field of Search ................................ 521/130, 170, 521/172, 173, 174

(56) References Cited

U.S. PATENT DOCUMENTS 5,798,533 A * 8/1998 Fishback et al. ....... 252/182.25
5,834,527 A * 11/1998 Sulzbach .................... 521/130

FOREIGN PATENT DOCUMENTS

JP   A 2002-20444    1/2002

* cited by examiner

Primary Examiner—John M. Cooney, Jr.
(74) Attorney, Agent, or Firm—Oliff & Berridge, PLC

(57) ABSTRACT

The present invention relates to a preparation method for low-density polyurethane foam excelling in the flame retardance and the dimensional stability, wherein rigid polyurethane foam having the average value for the ratio of lengthwise direction diameter/cross direction diameter of cells being 1.0 to 1.4 and the density of 20 to 40 kg/m$^3$ is prepared by combining, as blowing agent, carbon dioxide generated in the reaction between water and polyisocyanate and carbon dioxide under supercritical state, subcritical state or liquid state, and by adding said water and said carbon dioxide under liquid state into said polyol component prior to mixing the polyisocyanate component and the polyol component, and to rigid polyurethane foam obtained by said method.

7 Claims, 3 Drawing Sheets

CROSS SECTIONAL VIEW CUT PARALLEL TO RISE

CROSS SECTIONAL VIEW CUT PERPENDICULAR TO RISE

CROSS SECTIONAL VIEW CUT PARALLEL TO RISE

CROSS SECTIONAL VIEW CUT PERPENDICULAR TO RISE

PREPARATION METHOD FOR RIGID POLYURETHANE FOAM

BACKGROUND OF THE INVENTION

1. Field of the Invention

The present invention relates to the preparation method for polyurethane foam. In more detail, the present invention relates to the preparation method for low-density rigid polyurethane foam excelling in the flame retardance and the dimensional stability.

2. Description of the Related Art

Prior art is Japanese Patent Application Laid-open No. 2002-020444.

Rigid polyurethane foam excels in insulation characteristics and moldability among other properties and is thus widely used as insulating materials or structural materials for the housing, the cold storage and the like. Said foam is generally prepared by reacting suitable polyisocyanate with polyol in the presence of the blowing agent. Hydorchlorofluorocarbon (HCFC) is mainly used as the blowing agent for the preparation of rigid polyurethane foam, but HCFC may not be used in the future due to the depletion of the ozone layer. Furthermore, hydrofluorocarbon (HFC) is recently proposed as an alternate candidate for HCFC which may not deplete the ozone layer, but there exists the shortcoming of greater green house effect. Hydrocarbon can be mentioned as the blowing agent other than HCFC and HFC, but they can not be said to be practical as they possess the explosive flammability and pose the safety problem awaiting solution. Therefore, the general tendency has been to use carbon dioxide generated in the reaction between water and polyisocyanate as the blowing agent. However, when rigid polyurethane foam is prepared by using such carbon dioxide alone, there exists the shortcoming of foams being easily shrinked as the rate of diffusion toward the outside of the foam for carbon dioxide within the formed foam is greater than the rate of influx for air into the foam, thus reducing the internal pressure of the foam therein. Means for solving such problem are known such as increasing the strength by increasing the density of rigid polyurethane foam or by opening a part of cells. However, increasing the density is not only ineconomical but also leading to the increase in fuming quantity, so it becomes difficult to pass the Grade 3 incombustibility test specified according to JISA1321. On the other hand, it is economical to make the interconnecting cell rather than the closed-cell as the insulating materials because the thermal conductivity immediately after the preparation is 0.023 mW/(m·K) becoming to 0.035 mW/(m·K) due to displacement in a short time of carbon dioxide in the foam by air for the closed-cell of rigid polyurethane foam prepared with carbon dioxide generated in the reaction between water and polyisocyanate as the sole blowing agent. However, the water vapor permeance is large at the closed-cell content of less than 50%. Moreover, the volume of water required becomes greater because more carbon dioxide is required in order to decrease the density. Thus, rigid polyurethane foam to be formed becomes friable and the adhesion tends to become weaker with the formation of excess urea bond. As such, there exist various problems as to forming rigid polyurethane foam by using solely carbon dioxide generated in the reaction between water and polyisocyanate.

Therefore, in recent days, the technology wherein combining carbon dioxide under supercritical fluid, subcritical fluid or liquid state in addition to carbon dioxide generated in the reaction between water and polyisocyanate as blowing agent is proposed in order to further improve properties of rigid polyurethane foam to be formed.

For example, Japanese Patent Application Laid-open No. 2002-020444 discloses the production method with an ultrafine-cell foam production apparatus equipped with a plurality of pumping means for metering and delivering raw material components necessary for producing a polyurethane or polyisocyanurate foam, a plurality of transport means for transporting the raw material components delivered by the pumping means to the site of object, and a mixing chamber for mixing the raw material components, wherein at least one raw material component flowing through the transport means is set at $20 \times 10^2$ kPa or higher and that a gas is continuously dissolved into the raw material component flowing through the transport means under a pressure higher than that of the component. The preferred embodiment among them is such that said gas is $CO_2$ gas that is also injected into the raw material component flowing through the transport means under the pressure more than the critical pressure. Furthermore, the apparatus wherein each of a tank holding polyisocyanate component and a compounding tank holding polyol component, foam stabilizer, catalyst and the blowing agent (water) is connected to the mixing chamber through piping is described in Examples, but it is so contrived that water as the blowing agent is compounded into the polyol component beforehand and stored, and its mixture is transported to the mixing chamber through piping at the reaction time with the polyisocyanate component.

The formation of an ultrafine-cell foam to a extent of a few $\mu$m/piece to several tens $\mu$m/piece by using carbon dioxide under subcritical fluid, supercritical fluid or liquid state as the blowing agent is only described in said publication.

On the other hand, the foam giving good dimensional stability even at high temperature and low temperature is preferred as rigid polyurethane forms are widely used as the insulating materials or structural materials for the housing, the refrigerator and the like. However, as the configuration of cells in general is in the form of the anisotropy extending toward the rise direction, and the strength between the rise direction and its perpendicular to rise direction differ, there is a tendency wherein the larger the anisotropy of cells, the lower the dimensional stability.

SUMMARY OF THE INVENTION

The inventors of the present invention have made an intensive research studying various methods, and the present invention has been achieved by finding that low-density rigid polyurethane foam excelling in the flame retardance and the dimensional stability whose inside cell structure of rigid polyurethane foam evenly extend to all directions showing the isotropy of nearly sphere can be obtained by using, as blowing agent, carbon dioxide generated in the reaction between water and polyisocyanate and carbon dioxide under supercritical state, subcritical state or liquid state, and further, by mixing said water and said carbon dioxide under liquid state with the polyol component prior to mixing the polyisocyanate component and the polyol component.

DETAILED DESCRIPTION OF THE INVENTION

Figure 1:
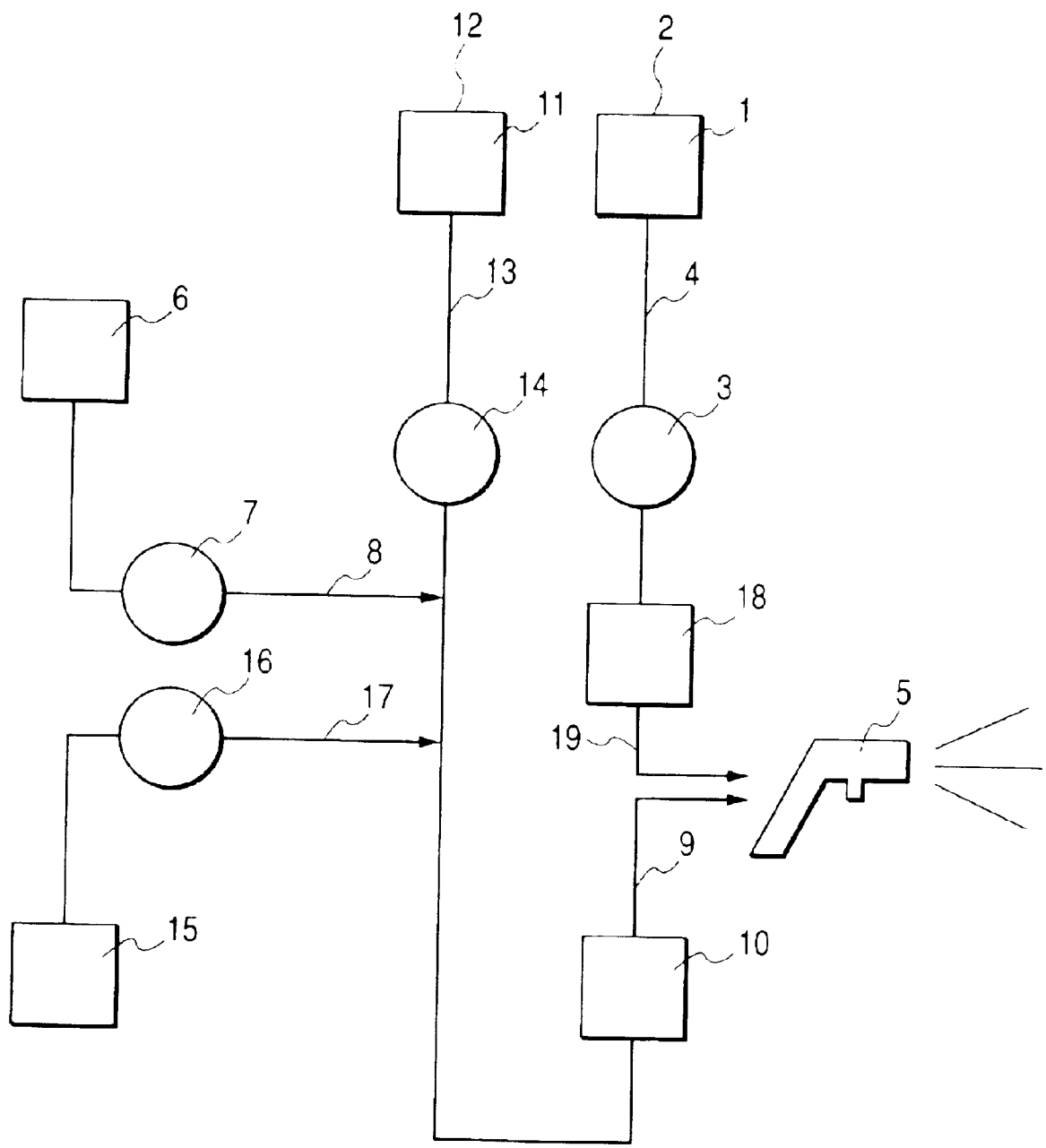
FIG. 1 is a view showing one embodiment of the preparation apparatus for rigid polyurethane foam.

The present invention relates to the preparation method for low-density rigid polyurethane foam excelling in the flame retardance and the dimensional stability, wherein rigid polyurethane foam having the average value for the ratio of lengthwise direction diameter/cross direction diameter of cells being 1.0 to 1.4 and the density of 20 to 40 kg/m$^3$ is prepared by combining, as blowing agent, carbon dioxide generated in the reaction between water and polyisocyanate, and carbon dioxide under supercritical state, subcritical state or liquid state, and by adding said water and said carbon dioxide under liquid state into said polyol component prior to mixing the polyisocyanate component and the polyol component. Especially, the present invention relates to the preparation method, wherein the closed-cell content is from 70 to 85% and the water vapor permeance is less than 420 ng/(m$^2$·S·Pa) at the thickness of 25 mm. In addition, the present invention relates to the preparation method, wherein said water is compounded at an amount of 5 to 8 parts by weight to 100 parts by weight of polyol in said polyol component, and said carbon dioxide under liquid state is compounded at an amount of 0.5 to 3% by weight to the sum of said polyisocyanate component and said polyol component. Furthermore, the present invention relates to the preparation method, wherein aromatic polyester polyol is present at an amount of 60 to 90 parts by weight to 100 parts by weight of said polyol. More preferably, the present invention relates to the preparation method, wherein the flame retardant is compounded at an amount of 20 to 40 parts by weight to 100 parts by weight of said polyol. The present invention also relates to rigid polyurethane foam obtained by any methods described above.

In the present invention, the improvement in the dimensional stability for rigid polyurethane foam to be formed can be achieved by using, as blowing agent, carbon dioxide generated in the reaction between water and polyisocyanate and carbon dioxide under supercritical state, subcritical state or liquid state, but it is necessary to set the addition timing of water and carbon dioxide under liquid state into the polyol component prior to mixing with the polyisocyanate component and the polyol component. Following shortcomings may be possibly observed in the means of adding into the polyol component in advance as has been done in the past. That is to say that the polyol component containing water shows poor storage stability and the change in properties can be observed in comparatively short time, as the polyol component, especially polyester polyol, have the property of being liable to hydrolyses. Therefore, the reactivity with polyisocyanate decreases and it is apprehended that normal rigid polyurethane foam may not be formed. It follows that the addition timing of water is set prior to mixing the polyisocyanate component and the polyol component in the present invention in order to effectively prevent hydrolyses of polyester polyol with time. For example, as to the addition timing of water in the preparation process, a water supplying apparatus may be set in front of the heater installed within the transfer piping when said transfer piping for said polyol component is connected from the storage tank for the polyol component to the mixing head where mixing of the polyisocyanate component with the polyol component are to be carried out. Preferably, the addition timing of water is in front of the heater installed within said transfer piping and just in front or behind the part at which carbon dioxide under liquid state is added into said transfer piping. More preferably, the addition timing of water is within the piping before the addition of carbon dioxide under liquid state into said transfer piping.

Such being the case, water tends to dissolve into the polyol component by mixing with carbon dioxide under liquid state. Therefore, for example, when carbon dioxide under liquid state is added into said transfer piping, the desired foam can be formed by adding water into said transfer piping closer to the point of carbon dioxide addition as carbon dioxide can be easily dissolved into the polyol component.

Numerous cells are formed within rigid polyurethane foam obtainable with the reaction between polyisocyanate and polyol, and properties of rigid plyurethane foam are affected by this cell configuration. The configuration of cells generally exhibits the anisotropy extending long and narrow toward the rise direction, but polyurethane foam with cell structure which evenly extend to all directions showing the isotropy of nearly sphere has the strength even with low density and shows properties excelling in the dimensional stability. The ratio of lengthwise direction diameter (L)/cross direction diameter (D) of cells of rigid polyurethane foam to be formed by the preparation method according to the present invention falls within 1.0 to 1.4 and thus cells show the isotropy and the configuration is sphere. When L/D is over 1.4, the configuration of cells is the anisotropy extending long and narrow and rigid polyurethane foam excelling in the dimensional stability can not be formed. Furthermore, the ratio of lengthwise direction diameter (L)/cross direction diameter (D) of cells is preferably within 1.0 to 1.2 for rigid polyurethane foam excelling in the dimensional stability.

The fact that carbon dioxide under supercritical state, subcritical state or liquid state in addition to carbon dioxide generated in the reaction between water and polyisocyanate are combined as the blowing agent in this invention is well favored in respect that properties of the foam to be formed can be much improved. That is to say that carbon dioxide under supercritical state, subcritical state or liquid state have the effect in advancing the mixing ability of the polyisocyanate component and the polyol component, and thus the homogeneity of said two components is improved. Moreover, as water and the above-mentioned carbon dioxides as the blowing agent themselves can be in the homogeneously diffused state within the reaction system, fine foams with homogeneous cell size are formed after the reaction. In addition, as the amount of water can be reduced by separately adding carbon dioxide under liquid state and thereby decreasing urea bond, the favorable effects such as the low friability of rigid polyurethane foam to be formed, the improved adhesion and the like can be obtained.

Carbon dioxide generated in the reaction between water and polyisocyanate combined with carbon dioxide under supercritical state, subcritical state or liquid state are used according to the present invention, but it is preferable to use carbon dioxide under supercritical state and subcritical state which have high diffusion coefficient and are greater in activity for making foam of rigid polyurethane foam fine.

The amount of carbon dioxide under liquid state to be added is preferably 0.5 to 3% by weight based on the sum of the polyisocyanate component and the polyol component, although the amount depends to some degree on the density of rigid polyurethane foam to be prepared as well as the viscosity of the polyisocyanate component and the polyol component. Because if the amount of carbon dioxide exceeds over 3% by weight, then the explosive vaporization may occur when the mixture of the polyisocyanate component and the polyol component is discharged from the mixing head, the closed-cell content became less than 70% and the water vapor permeance tends to increase in addition to the decrease in the surface smoothness of rigid polyurethane foam to be prepared. In addition, if the amount of carbon dioxide added is less than 0.5% by weight, the effect can not be practically observed, and the closed-cell content exceeds over 85% and thus the dimensional stability tends to decrease. The amount more preferably to be added of carbon dioxide under liquid state is 1 to 2% by weight.

Water is added to the polyol component, but the amount to be added is preferably 5 to 8 parts by weight based on 100 parts by weight of polyol in the polyol component. When the amount of water to be added is less than 5 parts by weight, the density of rigid polyurethane foam to be formed became high due to insufficient foaming and furthermore, it becomes difficult to pass Grade 3 incombustibility test specified according to JIS-A-1321. In addition, when the amount of water to be added is over 8 parts by weight, excess urea bond is formed and the adhesion tends to become lower as rigid polyurethane foam to be formed become friable.

Polyol which can be used in the present invention may be aromatic polyester polyol by itself or the combination of aromatic polyester polyol and polyether polyol.

Examples of aromatic polyester polyol are for example polyols derived from phthalic anhydride, scrap of polyethylene terephthalate, dimethyl terephthalate process residue and the like.

Examples of polyether polyol are for example amino polyol of ethylenediamine, tolylenediamine, triethanolamine, Mannich condensate and the like with the addition of alkylene oxide such as ethylene oxide, propylene oxide and the like.

The polyol component used in the present invention preferably contain 60 to 90 parts by weight of aromatic polyester polyol and 40 to 10 parts by weight of polyether polyol based on 100 parts by weight of the sum of aromatic polyester polyol and polyether polyol. When the content of aromatic polyesterpolyol is less than 60 parts by weight, it may fail in the Grade 3 incombustibility test specified according to JIS-A-1321 in some cases, and when the content of aromatic polyester polyol exceeds over 90 parts by weight, hardening of foam tends to de intensely retarded. Especially preferred content of aromatic polyester polyol is 70 to 80 parts by weight.

Examples of catalyst to be added into the polyol component used in the present invention are for example amine catalysts such as dimethylethanolamine, triethylenediamine, dimethylcyclohexylamine, 1,2-dimethylimidazole, pentamethyldiethylenetriamine, bis (2-dimethylaminoethyl) ether and the like, and especially foaming catalysts which enhance the reaction of isocyanate with water, such as pentamethyidiethylenetriamine, bis (2-dimethylaminoethyl) ether and the like, are preferred. In addition, metal catalysts such as lead octoate acid, dibutyltin dilaurate and the like as well as isocyanurate catalysts such as tris (dimethylaminopropyl) hexahydro-s-triazine, potassium acetate, potassium octoate acid and the like can be used. They can be of course used in combination.

Examples of polyisocyanate used in the present invention are such as polymethylene polyphenyl isocyanate, 4,4'-diphenylmethane diisocyanate, 2,4-tolylene diisocyanate, 2,6-tolylene diisocyanate, 4,6-dimethyl-1,3-phenylenediisocyanate, 4,4'-dibenzyl diisocyanate, 9,10-anthracenediisocyanate, 4,3'-dimethyl-4,4'-diphenyl diisocyanate, xylylene diisocyanate, 2,6-dimethyl-4,4'-diphenyl diisocyanate, 2,4'-diphenylmethane diisocyanate and the like. The amount to be used is 1 to 1.5 of NCO/OH equivalence ratio.

Flame retardant used in the present invention are phosphate such as trimethylphosphate, triethylphosphate, trischloropropylphosphate and the like, and the amount to be added is preferably 20 to 40 parts by weight based on 100 parts by weight of polyol. When the amount to be added is less than 20 parts by weight, it may fail in the Grade 3 incombustibility test specified according to JIS-A-1321 in some cases. Phosphate and the like give plasticity to urethane resin and thus have the effects on improving the friable that is the shortcoming of rigid polyurethane foam to be formed with water as the blowing agent and enhancing the adhesion, but if the amount of phosphate exceeds 40 parts by weight, the strength tends to decrease due to the immoderate plasticity.

Any additives used in general for the preparation of rigid polyurethane foam, for example, polyoxyalkylene type foam stabilizer such as polyoxyalkylenealkylether and the like, silicone type foam stabilizer such as organosiloxane and the like, compatibilizing agent such as oxyethylenealkylphenol, viscosity reducing agent, colorant, stabilizer and the like can be of course used in the preparation method of rigid polyurethane foam according to the present invention.

"Carbon dioxide under subcritical state" in the present invention means carbon dioxide under liquid state wherein the pressure is over the critical pressure for carbon dioxide and the temperature is less than the critical temperature, or carbon dioxide under liquid state wherein the pressure is below the critical pressure for carbon dioxide and the temperature is over the critical temperature, or carbon dioxide wherein both the temperature and the pressure are below the critical point, but nearly the critical state, to put it concretely that the temperature is over 20° C. and the pressure is over 5 Mpa. In addition, "carbon dioxide under supercritical state" indicates carbon dioxide wherein the pressure is over critical pressure of carbon dioxide and the temperature is over supercritical temperature.

As rigid polyurethane foam obtainable by the preparation method described above show high flame retardance and the isotropy whose ratio of lengthwise direction diameter/cross direction diameter of cells being within 1.0 to 1.4, there is less risk of shrinkage than rigid plyurethane foam obtainable by the preparation method heretofore and thus maintain high dimensional stability. Moreover, as the closed-cell content being 70 to 85% is high and thus the water vapor permeance is less than 420 ng/(m$^2$·S·Pa) at the thickness of 25 mm. Furthermore, they are economical as the product as the density is 20 to 40 Kg/m$^3$.

The present invention is further explained in detail with Examples, but it should not be taken to limit the present invention.

EXAMPLE

Raw materials used in Examples and Comparative Examples are as follows.

Polyisocyanate: polymethylenepolyphenylisocyanate (manufactured by Nippon Polyurethane Industry Co., Ltd.)

Polyol A: polyethyleneterephthalate type polyester polyol (hydroxyl value 110)

Polyol B: Mannich type polyether polyol (hydroxyl value 315)

Foam stabilizer: silicone foam stabilizer (L5420 by Nippon Unicar Co., Ltd.)

Catalyst A: pentamethyldiethylenetriamine (KAOLIZER No. 3 manufactured by Kao Corporation)

Catalyst B: tris (dimethylaminopropyl) hexahydro-s-triazine (Polycat 41 manufactured by Air Products Inc.)

Catalyst C: lead octoate acid (Pb-Oc manfuactured by Dainippon Ink and Chemicals Incorporated)

Flame retardant: trischloropropylphosphate (TMCPP by manufactured by Daihachi Chemical Ltd.)

Viscosity reducing agent: propylene carbonate (PC1000 manufactured by Arco Chemical Incorporated)

Next, an apparatus for the production of rigid polyurethane foam is described referring to FIG. 1.

Polyisocyanate component 1 is metered with a proportioning pump 3 connected through a piping 4 from a tank 2, and transferred to a mixing head 5 through a heater 18 to heat to a preset temperature and a heated hose 19. On the other hand, a polyol component 11 is metered with a proportioning pump 14 connected through a piping 13 from a tank 12, and transferred to the mixing head 5 through a heater 10 to heat to preset temperature and a heated hose 9.

Water in a water storage tank 15 is metered with a proportioning pump 7 interlockingly operated with each pump and introduced into the polyol component through a piping 17 connected with the piping 13 and mixed with the polyol component being transferred in the path of flow reaching to the mixing head 5.

Carbon dioxide under liquid state in a carbon dioxide bottle 6 is metered with the proportioning pump 7 interlockingly operated with each pump and introduced into the polyol component through a piping 8 connected with the piping 13, and mixed into the polyol component being transferred in the path of flow reaching to the mixing head 5.

In addition, mixing efficiency can be improved if a static mixer is provided between the introduction sites of carbon dioxide and water and the mixing head.

The polyisocyanate component and the polyol component mixed with carbon dioxide and water are kept in the path of flow reaching to the mixing head 5 at 50° C. and 7 MPa, and both components upon impingement mixed within the mixing head 5 are jetted out as the liquid state or the froth state into the air, and then rigid polyurethane foam is formed upon hardening.

Rigid polyurethane foam was obtained by spraying on a plywood with 12 mm in thickness and a slate plate with 6 mm in thickness by Model FF1600 (manufactured by Gusmer Admiral Inc. Ltd.) upon mixing the polyol component and the polyisocyanate component by using the apparatus illustrated in FIG. 1 according to the compounding recipe described in Table 1. The temperature and the pressure within the heated hose of the polyol component and the polyisocyanate component in this instance are set at 50° C. and 7 MPa.

Further, the process wherein water is stored in the water storage tank 15 and mixed into the polyol component being transferred in the piping 13 through the piping 17 was taken according to Examples 1 to 5 and Comparative Examples 1 to 3. On the other hand, the total amount of water to be used is mixed into the polyol component tank 12 beforehand and used after left standing for over two weeks according to Comparative Example 4. Therefore, the water storage tank 15 and the pump 16 were not used according to Comparative Example 4.

The smoothness of foam was observed during foaming of the spray, and the density, the closed-cell content, the water vapor permeance and the dimensional stability were measured for obtained rigid polyurethane foam according to the method described above. The smoothness is rated as O when the surface is smooth and rated as X when the surface is irregular. The density was measured by metering the test piece measuring 70 mm×70 mm×20 mm. The closed-cell content was measured according to ASTM D2856 and the water vapor permeance was measured according to JIS Z0208. The dimensional stability at high temperature was measured by making a thorough examination for the presence of the change in shape of the test piece after left standing for 48 hours at 100° C., and rated as O when the change in shape was not detected and rated as X when the change in shape was detected. The dimensional stability at low temperature was measured by making a thorough examination for the presence of the change in shape of the test piece after left standing for 48 hours at −20° C., and rated as O when the change in shape was not detected and rated as X when the change in shape was detected. The Grade 3 incombustibility test was conducted according to JIS A1321 with the test piece consisting of the slate plate with 6 mm in thickness spray-foamed with 25 mm in thickness. The average value for the ratio of lengthwise direction diameter/cross direction diameter of cells was rated as O when the average value for the ratio of lengthwise direction/cross direction diameters of cells was from 1.0 to 1.4 and rated as X when the average value for the ratio of lengthwise direction/cross direction diameters of cells exceeds over 1.4 after cutting the foam to the foaming direction, taking the picture of the section with an electron microscopy and measuring the average value for the ratio of lengthwise direction/cross direction diameters of cells.

The test results for each Example and as well as Comparative Example are illustrated in Table 1.

TABLE 1

| | | Example | | | | | Comparative Example | | | |
|---|---|---|---|---|---|---|---|---|---|---|
| | | 1 | 2 | 3 | 4 | 5 | 1 | 2 | 3 | 4 |
| Polyol Component | Polyol A | 75 | 75 | 75 | 75 | 75 | 75 | 75 | 75 | 75 |
| | Polyol B | 25 | 25 | 25 | 25 | 25 | 25 | 25 | 25 | 25 |
| | Foam stabilizer | 1 | 1 | 1 | 1 | 1 | 1 | 1 | 1 | 1 |
| | Catalyst A | 5 | 5 | 5 | 5 | 5 | 5 | 5 | 5 | 5 |
| | Catalyst B | | 1 | | | | | | | |
| | Catalyst C | 3 | 3 | 3 | 3 | 3 | 3 | 3 | 3 | 3 |
| | Flame retardant | 30 | 30 | 30 | 30 | 30 | 30 | 30 | 30 | 30 |
| | Viscosity reducing agent | 5 | 5 | 5 | 5 | 5 | 5 | 5 | 5 | 5 |
| Polyisocyanate component | | 152 | 152 | 152 | 152 | 152 | 152 | 152 | 152 | 152 |

TABLE 1-continued

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Carbon dioxide (% by weight) | 1 | 1.5 | 0.5 | 3 | 1.5 | 0 | 1.5 | 4 | 1.5 |
| Water (part by weight) | 6 | 6 | 6 | 5 | 8 | 6 | 3 | 6 | 6 |
| Smoothness | ○ | ○ | ○ | ○ | ○ | ○ | ○ | X | — |
| Density (kg/m$^3$) | 30.1 | 27.6 | 30.9 | 27 | 26.5 | 32 | 43.8 | 25.1 |  |
| Closed-cell content (%) | 80.8 | 80.3 | 82.4 | 78.5 | 81.3 | 90.3 | 81.7 | 61.5 |  |
| Water vapor permeance (ng/(m$^2$ · S · Pa)) | 395 | 400 | 388 | 408 | 410 | 200 | 195 | 480 |  |
| Dimensional stability at high temperature | ○ | ○ | ○ | ○ | ○ | X | ○ | ○ |  |
| Dimensional stability at low temperature | ○ | ○ | ○ | ○ | ○ | ○ | ○ | ○ |  |
| Grade 3 incombustibility | Pass | Pass | Pass | Pass | Pass | Pass | Failure | — |  |
| Average value for the ratio of L/D | ○ | ○ | ○ | ○ | ○ | X | ○ | ○ |  |

Figure 2A:
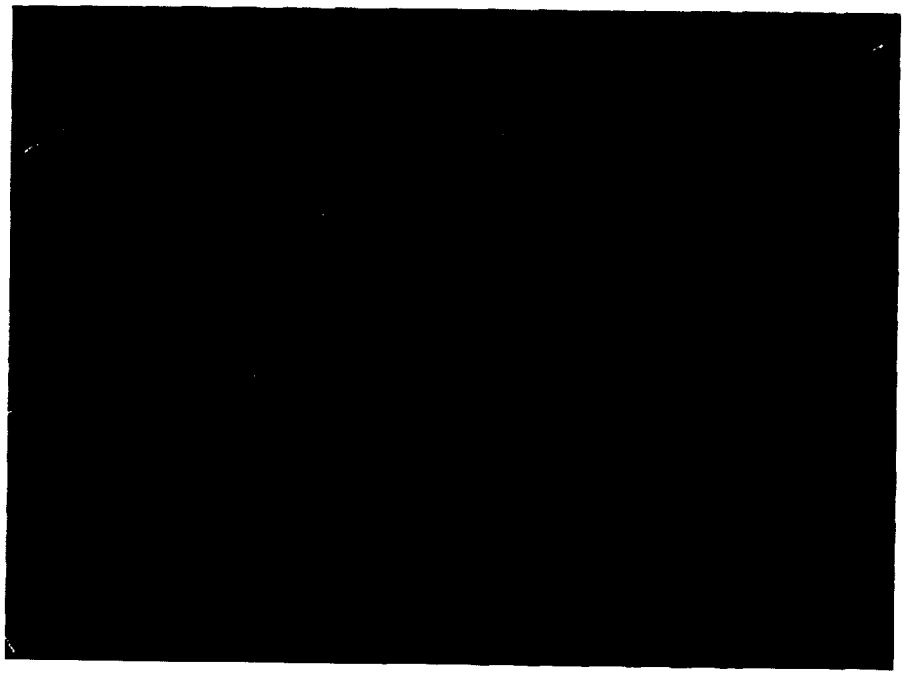
FIG. 2A is a cross sectional view by cut parallel to rise of rigid polyurethane foam according to Example 2.
Figure 2B:
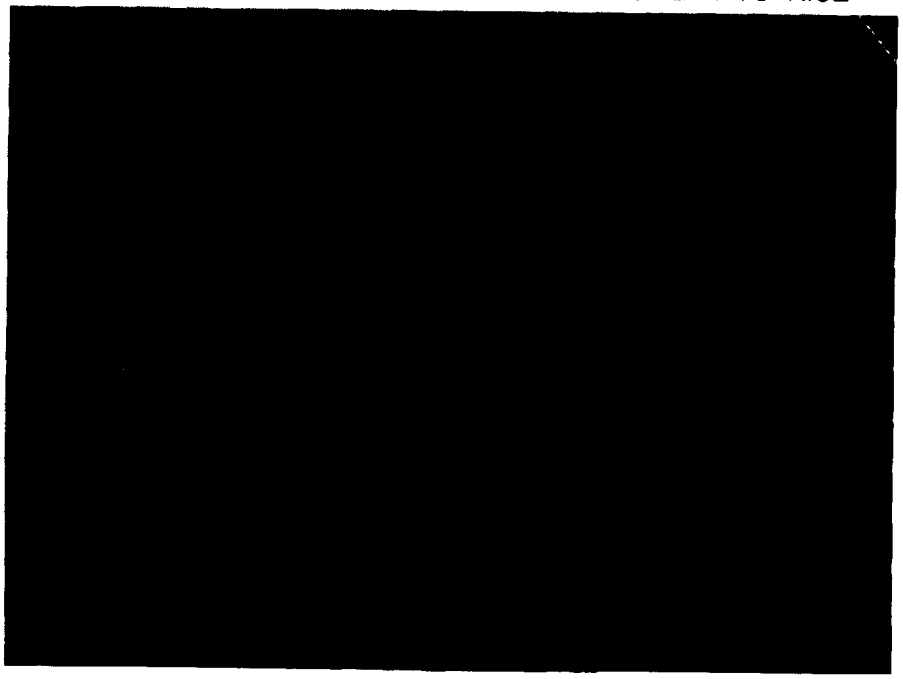
FIG. 2B is a cross section view by cut perpendicular to rise.
Figure 3A:
FIG. 3A is a cross sectional view by cut parallel to rise of rigid polyurethane foam according to Comparative Example 1 and FIG. 3B is a cross sectional view by cut perpendicular to rise.
Figure 3B:
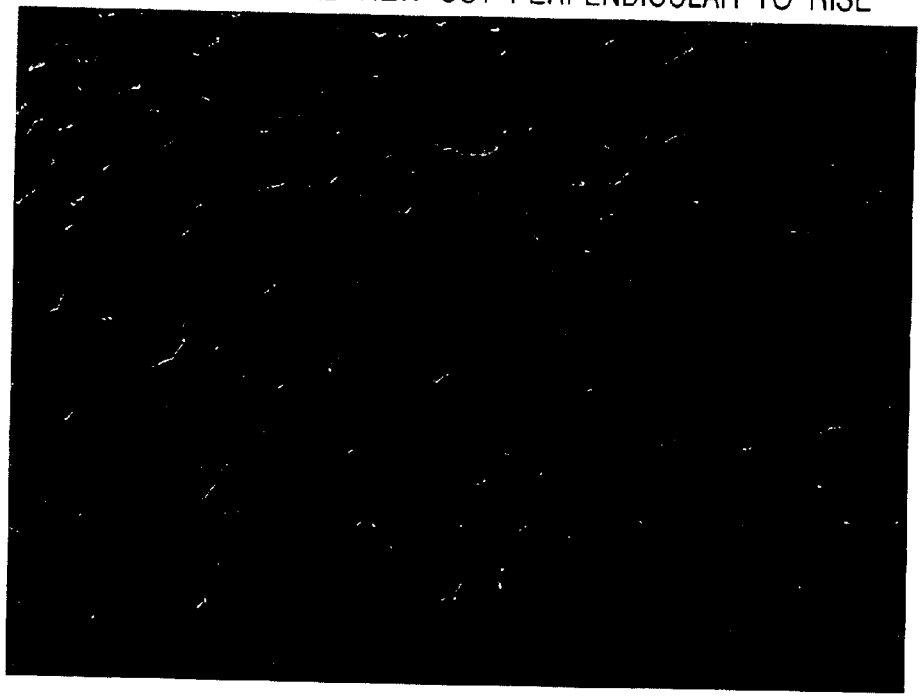
Figure 2A:
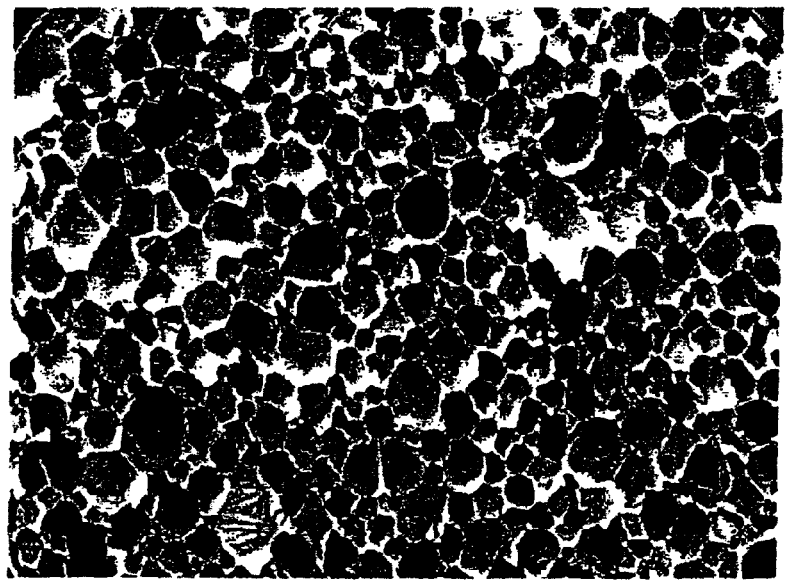
Figure 2B:
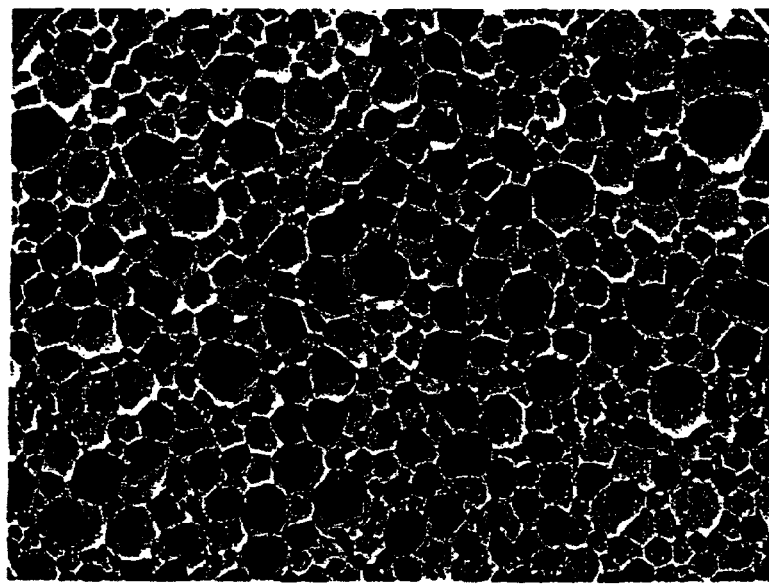
Figure 3A:
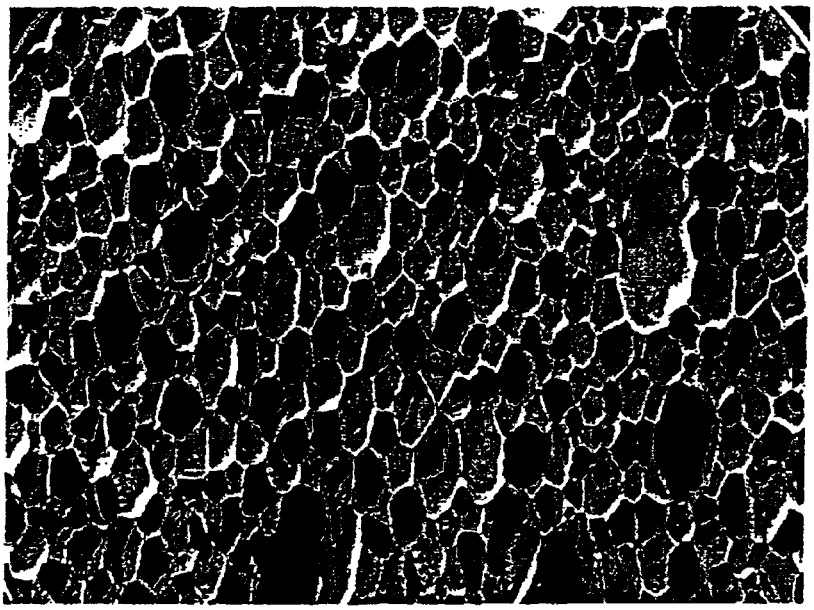
Figure 3B:
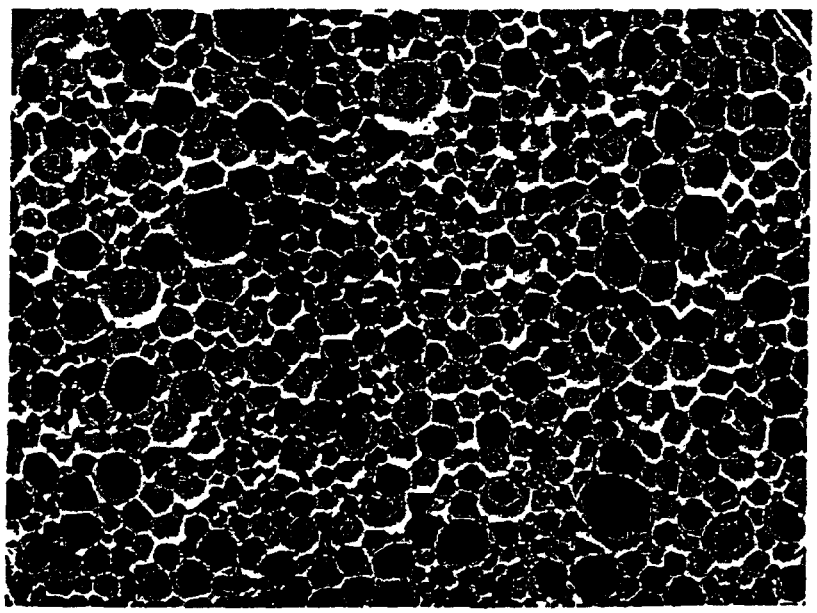

Rigid polyurethane foam obtained according to Example 2 and Comparative Example 1 were cut along the foaming direction as well as the crossing direction at the right angle to the foaming direction, and their cross sectional views were each observed with an electron microscopy (JSM6700NT manufactured by Nippon Electronics K.K.) with about 30 times magnification. The foam according to Example 2 is shown in FIG. 2A and FIG. 2B and the foam according to Comparative Example 1 is shown in FIG. 3A and FIG. 3B. Furthermore, the cross section parallel to rise is shown in FIG. 2A and FIG. 3A and the crossing direction perpendicular to rise is shown in FIG. 2B and FIG. 3B.

Rigid polyurethane foams formed according to Examples 1 to 5 were obtained as rigid polyurethane foam with the closed-cell content of 70 to 85%, the water vapor permeance of less than 420 ng/(m$^2$·S·Pa) at the thickness of 25 mm, and the density as low as 20 to 40 kg/M$^3$. On the other hand, some of rigid polyurethane foam according to Comparative Example 1 which is the example wherein carbon dioxide under supercritical state, subcritical state or liquid state is not used are with the closed-cell content exceeding 85% and the small water vapor permeance, but the dimensional stability at high temperature was inferior as the average value for the ratio of lengthwise direction diameter/cross direction diameter of cells was more than 1.4. Although carbon dioxide under supercritical state is used according to Comparative Example 2, rigid polyurethane foam obtained therein did not pass the Grade 3 incombustibility test as the density was high with 43.8 kg/m$^3$ when the amount of water used was less than 5 parts by weight. Although the density of rigid polyurethane foam according to Comparative Example 3 was acceptable at low level of 25.1 kg/m$^3$, the surface of rigid polyurethane foam formed was totally devoid of the smoothness by the explosive vaporization as the amount added of carbon dioxide as the blowing agent exceeded over 3% by weight, and the water vapor permeance was over 420 ng/(m$^2$·S·Pa) as the closed-cell content was less than 70%. In addition, the Grade 3 incombustibility test could not be performed because the surface smoothness was conspicuously absent. Furthermore, under the condition according to Comparative Example 4 wherein water was added to the polyol component beforehand and left standing over two weeks period, the reaction proceeded very slowly in comparison to the result according to Example 2 with similar composition and varieties of characteristics could not be evaluated as the contraction after 24 hours was great.

Cells formed according to FIG. 2A and FIG. 2B exhibited the isotropy of nearly sphere and in addition, it was easy to see that the size of each cell was nearly uniform. On the other hand, cells formed according to FIG. 3A and FIG. 3B exhibited the anisotropy extending long and narrow toward the foaming direction and the size of cells was more or less uneven. This result supported that the process wherein carbon dioxide under liquid state was compounded into the polyol component prior to mixing the polyisocyanate component and the polyol component made the configuration of cells sphere, thus resulting in the satisfactory dimensional stability.

Rigid polyurethane foam having low density and high flame retardance and excelling in the dimensional stability can be obtained by the preparation method according to the present invention. In addition, rigid polyurethane foam prepared according to the present invention shows the ratio of lengthwise direction diameter/cross direction diameter of cells being 1.0 to 1.4, the closed-cell content of 70 to 85%, the water vapor permeance of less than 420 ng/(m$^2$·S·Pa) at the thickness of 25 mm and the density of 20 to 40 kg/m$^3$.

What is claimed is:

1. A preparation method for low-density rigid polyurethane foam excelling in dimensional stability, wherein a rigid polyurethane foam having an average value for a ratio of lengthwise direction diameter/cross direction diameter of cells of 1.0 to 1.4 and a density of 20 to 40 kg/m$^3$ is prepared by combining, as blowing agent, carbon dioxide generated in the reaction between water and polyisocyanate and carbon dioxide under supercritical state, subcritical state or liquid state, and by adding said water and said carbon dioxide under liquid state into said polyol component, which polyol component is being transferred in a flow path to a mixing head and the addition occurs prior to mixing the polyisocyanate component and the polyol component in the mixing head, and the polyol component prepared by combining the water and the carbon dioxide under liquid state is kept under a state which corresponds to supercritical state of carbon dioxide or subcritical state of carbon dioxide in the flow path to the mixing head, wherein
   a closed-cell content is from 70 to 85% and a water vapor permeance is less than 420 ng/(m$^2$·S·Pa) at a thickness of 25 mm, and wherein
   said water is mixed in an amount of 5 to 8 parts by weight to 100 parts by weight of polyol in said polyol component, and said carbon dioxide under liquid state is mixed in an amount of 0.5 to 3% by weight to a sum of said polyisocyanate component and said polyol component.

2. The preparation method according to claim 1, wherein an aromatic polyester polyol is present in an amount of 60 to 90 parts by weight to 100 parts by weight of said polyol.

3. The preparation method according to claim 1, wherein a flame retardant is added to the polyurethane foam as an additive, and wherein the flame retardant is mixed in an amount of 20 to 40 parts by weight to 100 parts by weight of said polyol.

4. Rigid polyurethane foam obtained by the method according to claim 1.

5. Rigid polyurethane foam obtained by the method according to claim 2.

6. Rigid polyurethane foam obtained by the method according to claim 3.

7. The preparation method according to claim 1, wherein the average value for the ratio of lengthwise direction diameter/cross direction diameter of cells of the rigid polyurethane foam is from 1.0 to 1.2.

* * * * *

UNITED STATES PATENT AND TRADEMARK OFFICE
CERTIFICATE OF CORRECTION

| | |
|---|---|
| PATENT NO. | : 6,960,618 B2 |
| APPLICATION NO. | : 10/646829 |
| DATED | : November 1, 2005 |
| INVENTOR(S) | : Yoshiyuki Ohnuma, Junichiro Mori and Hideki Tosaki |

It is certified that error appears in the above-identified patent and that said Letters Patent is hereby corrected as shown below:

Please delete, Figs. 2A, 2B, 3A and 3B depicted as black squares should be replaced with the attached Replacement Figs. 2A, 2B, 3A and 3B.

Signed and Sealed this

Tenth Day of October, 2006

JON W. DUDAS
*Director of the United States Patent and Trademark Office*

CROSS SECTIONAL VIEW CUT PARALLEL TO RISE

CROSS SECTIONAL VIEW CUT PERPENDICULAR TO RISE

CROSS SECTIONAL VIEW CUT PARALLEL TO RISE

CROSS SECTIONAL VIEW CUT PERPENDICULAR TO RISE